US012732586B2

(12) United States Patent
Ayala et al.

(10) Patent No.: US 12,732,586 B2
(45) Date of Patent: Sep. 8, 2026

(54) METHOD OF GENERATING MULTIPLEXED IMAGE FOR PRINTING BASED ON COLOR VALUES GAMUT-MAPPED TO INSIDE MAXIMUM VOLUME HYPERRECTANGLE

(71) Applicants: Toppan Security SAS, Paris (FR); Toppan Security Ireland Teoranta, Galway (IE); UNIVERSITÉ JEAN MONNET SAINT ETIENNE, Saint Etienne (FR); CENTRE NATIONAL DE LA RECHERCHE SCIENTIFIQUE, Paris (FR)

(72) Inventors: Stéphane Ayala, Oron-la-ville (CH); Nathalie Destouches, Saint-Etienne (FR); Mathieu Hébert, Lyons (FR); Nicolas Dalloz, Paris (FR)

(73) Assignees: TOPPAN SECURITY SAS, Paris (FR); TOPPAN SECURITY IRELAND TEORANTA, Galway (IE); UNIVERSITÉ JEAN MONNET SAINT ETIENNE, Saint Etienne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 154 days.

(21) Appl. No.: 18/721,685

(22) PCT Filed: Nov. 14, 2022

(86) PCT No.: PCT/EP2022/081747
§ 371 (c)(1),
(2) Date: Jun. 19, 2024

(87) PCT Pub. No.: WO2023/131433
PCT Pub. Date: Jul. 13, 2023

(65) Prior Publication Data

US 2025/0126219 A1 Apr. 17, 2025

(30) Foreign Application Priority Data

Jan. 7, 2022 (EP) .................................... 22315003

(51) Int. Cl.
*H04N 1/60* (2006.01)
*H04N 1/32* (2006.01)
*H04N 1/405* (2006.01)

(52) U.S. Cl.
CPC ....... *H04N 1/6061* (2013.01); *H04N 1/32256* (2013.01); *H04N 1/32309* (2013.01); *H04N 1/4052* (2013.01)

(58) Field of Classification Search
CPC . H04N 1/405–4058; H04N 1/60–6097; H04N 1/644; B41M 3/14; B41M 3/148; B41M 1/14; B41M 5/267; B41M 5/5272
See application file for complete search history.

(56) References Cited

U.S. PATENT DOCUMENTS 5,070,413 A 12/1991 Sullivan et al.
8,149,483 B2 * 4/2012 Kuno .................. H04N 1/6058 358/1.9

(Continued)

FOREIGN PATENT DOCUMENTS

EP 0639920 B1 * 3/1998 ............ H04N 1/644
EP 2609728 4/2018

(Continued)

OTHER PUBLICATIONS

"European Application Serial No. 22315003.8, Extended European Search Report mailed Jun. 24, 2022", 9 pgs.

(Continued)

*Primary Examiner* — Scott A Rogers
(74) *Attorney, Agent, or Firm* — Schwegman Lundberg & Woessner, P.A.

(57) ABSTRACT

A method of generating a multiplexed image for printing that can be observed in a plurality of modes includes
(Continued)

determining a finite shape of a multiplexed palette in a combined color space. The contrast of the multiplexed image in each mode can be optimized by determining a maximum volume hyperrectangle enclosed in the finite shape. Gamut mapping to this maximum volume hyperrectangle allows for generation of a multiplexed image that has a maximum contrast and is free from artifacts caused by an interdependency between the colors in each mode. Performing a dimensionality reduction using PCA allows for reducing the complexity of the optimization problem.

18 Claims, 6 Drawing Sheets

(56) References Cited

U.S. PATENT DOCUMENTS

| | | | | |
|---|---|---|---|---|
| 8,274,700 | B2 * | 9/2012 | Tin | H04N 1/603 358/1.9 |
| 9,368,086 | B2 * | 6/2016 | Oicherman | G06T 5/90 |
| 10,491,784 | B2 | 11/2019 | Pjanic et al. | |
| 11,095,864 | B2 * | 8/2021 | Thebault | H04N 1/6061 |
| 12,145,386 | B2 * | 11/2024 | Seidel | B41M 5/26 |
| 2007/0097389 | A1 | 5/2007 | Morovic | |
| 2021/0039422 | A1 | 2/2021 | Vangheluwe et al. | |
| 2024/0311600 | A1 * | 9/2024 | Ayala | G06K 15/1881 |

FOREIGN PATENT DOCUMENTS

| | | |
|---|---|---|
| EP | 3928997 | 12/2021 |
| EP | 4210314 | 5/2024 |
| WO | 2014075994 | 5/2014 |
| WO | 2023131433 | 7/2023 |

OTHER PUBLICATIONS

"International Application Serial No. PCT EP2022 081747, International Search Report mailed Feb. 1, 2023", 4 pgs.

"International Application Serial No. PCT EP2022 081747, Written Opinion mailed Feb. 1, 2023", 5 pgs.

"European Application Serial No. 22315003.8, Response Filed Nov. 9, 2023 to Extended European Search Report mailed Jun. 24, 2022", 11 pgs.

Destouches, Nathalie, "Laser-Empowered Random Metasurfaces for White Light Printed Image Multiplexing", Advanced Functional Materials, vol. 31, No. 18, [Online]. Retrieved from the Internet: URL:https: onlinelibrary.wiley.com doi full-xml 10.1002 adfm. 202010430, (May 25, 2021), 2010430 pg.

* cited by examiner

16A
Image RGB Mode 1
16
P_i
R1 G1 B1 R2 G2 B2
Multi-mode image
Image RGB Mode 2
16B
Rp1 Gp1 Bp1 Rp2 Gp2 Bp2
11
Multi-mode palette
Process next pixel
18
P_o
7/16 ∈
3/16 ∈
5/16 ∈
1/16 ∈
Multi-mode Image
Diffuse multi-mode error (vector): ∈ =
R1 — Rp1
G1 — Gp1
B1 — Bp1
R2 — Rp2
G2 — Gp2
B2 — Bp2 a.

b.

METHOD OF GENERATING MULTIPLEXED IMAGE FOR PRINTING BASED ON COLOR VALUES GAMUT-MAPPED TO INSIDE MAXIMUM VOLUME HYPERRECTANGLE

CROSS-REFERENCE TO RELATED APPLICATION(S)

This application is a national stage application under 35 U.S.C. § 371 of PCT Appl. No. PCT/EP2022/081747, titled "Method of Generating a Multiplexed Image for Printing," filed Nov. 14, 2022, which claims priority to European Patent Appl. No. 22315003.8, filed Jan. 7, 2022, each of which is incorporated herein by reference in its entirety.

TECHNICAL FIELD

The present disclosure generally relates to printing techniques, in particular, to a method of generating a multiplexed image for printing that can be observed in a plurality of modes and can be printed using a printing apparatus, for example, a laser marking apparatus.

BACKGROUND

Generally, the color palette with which images are printed, for example, using an inkjet printer, is constrained by the inks that are available (for example, cyan, magenta, yellow and black). In applications such as physical identification documents, it is common to use printing techniques such as laser marking, because this may allow for obtaining image features inside a polycarbonate substrate rather on a surface of the substrate. When a laser is used to produce colors, it may only be possible to reproduce a limited range of colors, and the link between the laser parameters and the produced colors is not trivial.

In some applications, it is desirable to build a security image, for example, for a security structure of a security document, by multiplexing a plurality of images. In this manner, a multiplexed image that can be observed in a plurality of observation conditions or modes, and that has different appearances in the respective modes can be obtained. For example, such a multiplexed image may have a first appearance when viewed in transmission, and may have a second, different (and possibly uncorrelated) appearance when viewed under backside reflection.

WO 2014/075994 A1 discloses a method for laser-structuring a nanoparticle network to generate colored patterns on a support.

US 2021/0039422 A1 discloses a method for building a security image by multiplexing color images.

U.S. Pat. No. 5,070,413 A discloses a halftoning method for creating a color binary image from a continuous tone color image.

US 2007/0097389 A1 discloses a method of adapting a color gamut of an image to be produced onto a set of colors achievable with a printing technique (gamut mapping).

U.S. Pat. No. 10,491,784 B2 relates to generating prints with multiple appearances.

DESTOUCHES NATHALIE ET AL: "Laser-Empowered Random Metasurfaces for White Light Printed Image Multiplexing", ADVANCED FUNCTIONAL MATERIALS, vol. 31, no. 18, 25 May 2021 (2021 May 25), page 2010430, XP055931272, DE ISSN: 1616-301X, DOI: 10.1002/adfm.202010430 relates to printed image multiplexing.

EP 3 928 997 A1 discloses a method for creating a colored laser marking.

EP 2 609 728 B1 relates to the synthesis of authenticable luminescent color halftone images.

The present disclosure is directed, at least in part, to improving or overcoming one or more aspects of prior systems.

SUMMARY OF THE DISCLOSURE

According to one aspect of the present disclosure, a method of generating a multiplexed image for printing that can be observed in a plurality of modes and can be printed using a laser marking apparatus comprises the steps of receiving a plurality of input images, and combining the plurality of input images to form a multiplexed input image. The method further comprises retrieving a multiplexed palette from a memory. The multiplexed palette includes a plurality of images that can be printed on a substrate surface by varying one or more parameters of the laser marking apparatus. Each image is observable in the plurality of modes and has a plurality of color values corresponding to the plurality of modes. The method further comprises determining a finite shape of the multiplexed palette in a combined color space based on the color values of the plurality of images, determining a maximum volume hyperrectangle enclosed in the finite shape of the multiplexed palette, and performing gamut mapping to map color values of the multiplexed input image to color values inside the maximum volume hyperrectangle. Finally, the method comprises obtaining the multiplexed image for printing based on the gamut-mapped color values of the multiplexed input image.

In another aspect, the present disclosure relates to a laser marking apparatus comprising a memory and a control unit configured to perform the method of the above aspect.

Other features and aspects of the present disclosure will be apparent from the following description and the accompanying drawings.

DETAILED DESCRIPTION

Figure 1:
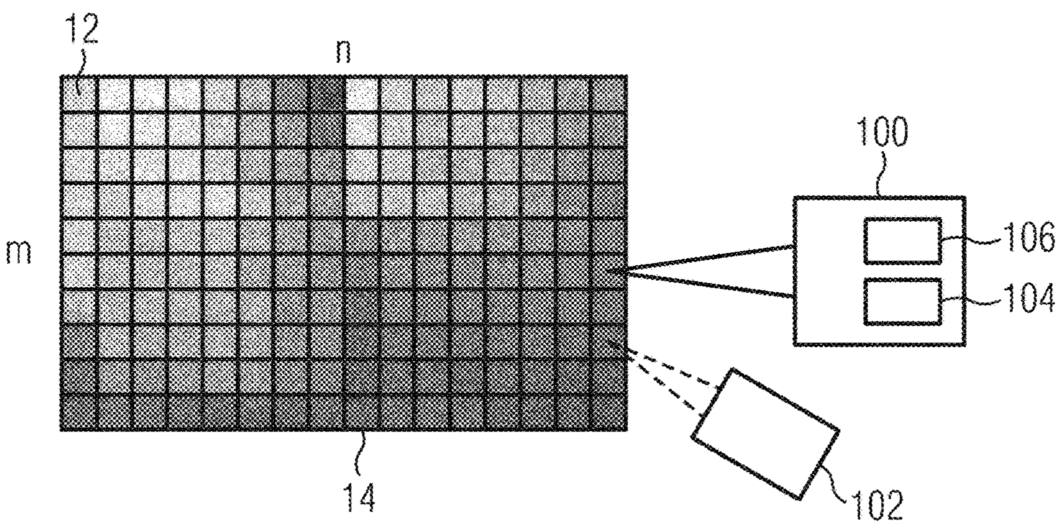
FIG. 1 shows an exemplary range of colors attainable using a printing apparatus.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that, when a multiplexed image is to be printed using a limited range of obtainable colors, commonly used techniques such as gamut mapping and halftoning cannot be extended to the multiplexed case in a straightforward manner. In particular, it has been realized that, in case a multiplexed input image including a first input image and a second input image is to be printed using multiplexed colors (image patches), which have a first color value in a first observation mode, and a second, different color value in a second observation mode, gamut mapping of a color value of the first input image also affects the color value of the second input image. In other words, the range of colors obtainable in one mode depends on the color chosen in another mode. In accordance with the present disclosure, it has been recognized that the range of colors in each mode can be optimized by maximizing an enclosed shape or box in a finite shape of the multiplexed palette including all obtainable multiplexed colors, for example, a convex hull or alpha shape of the multiplexed palette.

According to the present disclosure, the multiplexing of a plurality of images is considered in a higher-dimensional space rather than considering each mode independently. This allows for optimizing the contrast of each image simultaneously, by generalizing the concept of gamut mapping to multi-mode gamut mapping. Preferably, multiplexed images including at least one color image and having an optimized contrast in all modes can be obtained with the methods disclosed herein. Here, it has also been realized that a weighting can be performed to increase the contrast for one of the images at the cost of decreasing the contrast for one or more of the other images in the multiplexed image.

It has also been realized that the interdependence of the gamuts associated with the respective modes results in an optimization problem having a high dimensionality. Accordingly, it has been realized that it is advantageous to reduce the dimensionality of the problem before performing the optimization. In this respect, it has been realized that a change of basis can be performed in each separate color space. In particular, this allows for maximizing the volume of the finite shape that can be covered by an axis-aligned hyperrectangle in the combined color space. This change of basis can be coupled with a projection in order to reduce the dimensionality. Here, it has been realized that principal component analysis (PCA) can be used to find orthogonal axes that represent the data based on the eigenvectors of its covariance matrix. The eigenvectors found using PCA can be ranked by their variance, and the dimensionality reduction can be performed by using only the first vector or the two first vectors for each mode.

It has also been realized that, when multi-mode vector error diffusion is used, a high number of colors may be necessary for printing the multiplexed image. In particular, when laser marking is used, this can result in an increase in the processing time for forming the multiplexed image, due to switching delays between each set of laser parameters required to print each individual color. Therefore, it has been realized that it may be advantageous to reduce the number of colors in the multiplexed palette in such a manner that the volume of the finite shape in the combined color space is minimally reduced. The color values of the multiplexed input image are then mapped to the maximum enclosed hyperrectangle inside the finite shape obtained in this manner.

FIG. 1 shows an example of a color palette (in the following, simply referred to as "palette") formed by a plurality of images 12 printed by a printing apparatus 100, in particular, a laser marking apparatus. Printing apparatus 100 is configured to irradiate a substrate surface 14 of a substrate with laser light to modify material of the substrate. As shown in FIG. 1, printing apparatus 100 includes a control unit 106 and a memory 104, and operates in a known manner to irradiate substrate surface 14 with laser light to modify properties of the substrate for producing different colors.

In the example shown in FIG. 1, printing apparatus 100 is controlled by control unit 106 to print a first plurality of images 12 having mutually different, uniform color values on substrate surface 14 when viewed under the same observation condition by varying one or more parameters of printing apparatus 100. In particular, in case of printing apparatus 100 being a laser marking apparatus, the parameters may include one or more of: laser power; scanning speed; laser focus; laser spacing; repetition rate; laser polarization; laser wavelength; pulse duration. The material on substrate surface 14 may be a known ink or other coating that reacts to laser light to produce the plurality of different colors.

In some embodiments, one or more of the above-mentioned laser parameters are varied in a stepwise manner to produce the plurality of discrete colors shown in FIG. 1. In the example in FIG. 1, a palette including n×m colors is generated in this manner. Examples for a material that reacts to laser light include, for example, compounds including nanoparticles such as the ones known from WO 2014/075994 A1. In some embodiments, the compound may be a $TiO_2$ layer including Ag nanoparticles. Of course, any other known material that reacts to laser light and is able to produce different colors can be used. Each different color in FIG. 1 can be obtained by selecting the appropriate parameters and controlling printing apparatus 100 to irradiate the respective substrate surface with laser light with said selected parameters.

In the multiplexing applications of the present disclosure, each image 12 can be observed in a plurality of observation conditions (modes) and has a plurality of color values corresponding to the plurality of modes. For example, each image 12 may have a first color value when viewed in transmission, and a second, different color value when viewed under backside reflection. As used herein, the expression "color value" is not limited to a single scalar value, but can be a vector, as is common for a variety of known color spaces such as RGB or CIELAB. Therefore, for each image 12, two or more color values, one for each mode, can be measured using measuring device 102. In the following, an example in which each image 12 is observable in two modes will be described.

Figure 2:
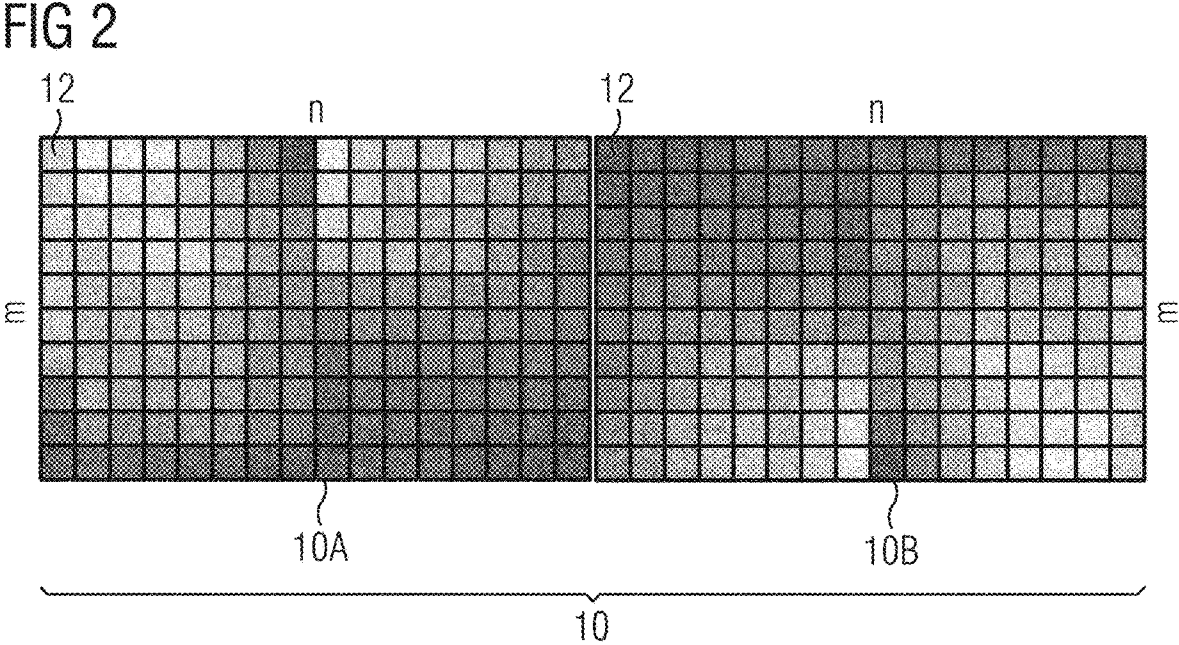
FIG. 2 shows an example of a multiplexed palette generated in accordance with the present disclosure.

FIG. 2 shows a multiplexed palette 10 obtained by printing the plurality of images 12 in the above-described a manner. As shown in FIG. 2, multiplexed palette 10 includes a first palette 10A including the color values of images 12 observed in a first mode, and a second palette 10B including the color values of images 12 observed in a second mode. It will be appreciated that palette 10 can be generated in advance, for example, during calibration of printing apparatus 100, and the color values of palette 10 can be stored in association with the parameters used to generate the same, for example, in a database stored in memory 104.

In order to print a desired image, in particular, a color image, it is usually necessary to use image processing techniques such as halftoning in order to be able to obtain colors that are not directly obtainable by any of the parameters of printing apparatus 100, i.e., colors that are not included in palette 10. Such printing techniques are well-known, and a specific one will be described in more detail below.

Figure 3:
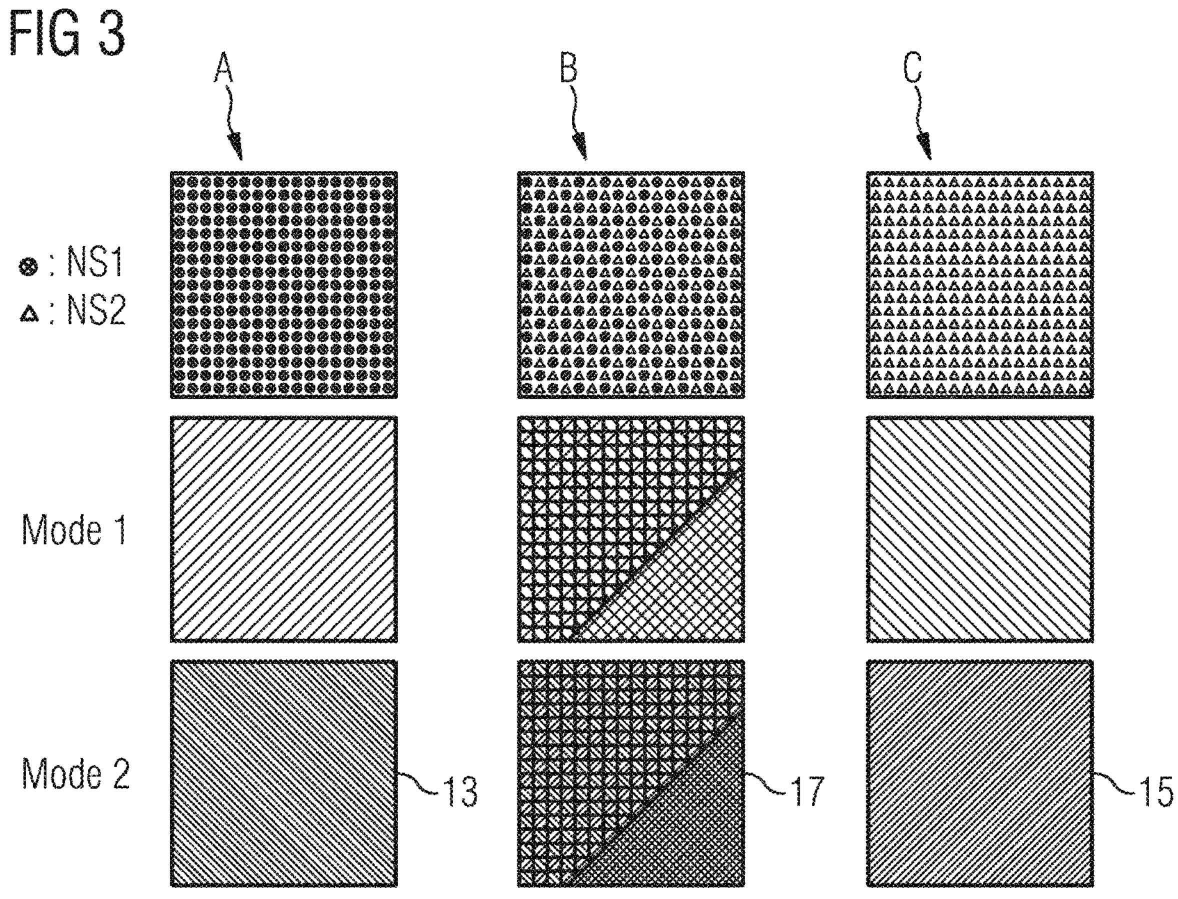
FIG. 3 shows an example of two multiplexed images used in the palette of the present disclosure.

FIG. 3 shows a schematic representation of a first image 13 and a second image 15 of the plurality of images obtained using printing apparatus 100. In FIG. 3, image 13 is obtained using a first set of parameters of printing apparatus 100, and image 15 is obtained using a second set of parameters of printing apparatus 100. When viewed in a first mode (under a first observation condition), each of images 13 and 15 has a first appearance (a respective color value) shown in the second row of FIG. 3, and when viewed in a second mode (under a second observation condition different from the first observation condition), each image has a different appearance (color value) shown in the third row. Intermediate colors in each mode can be obtained by performing a process such as halftoning, for example, using a checkerboard pattern of the color values of first image 13 and second image 15, as exemplified in the second column of FIG. 3. Here, the last two images shown in the second column of FIG. 3 show the checkerboard pattern on the upper left side, and on the lower right side the color that is observed when viewing the checkerboard pattern from a distance is shown.

In principle, the printing of a multiplexed input image could be performed in an analogous manner to the printing of a single non-multiplexed image. In other words, steps such as gamut mapping and halftoning could be extended in a straightforward manner to the multiplexed case. However, it is important to realize that the two or more modes are not completely independent. In other words, when gamut mapping is performed for the colors in the first mode, this may result in that the corresponding colors in the second mode are not inside the reproducible gamut. This may result in artifacts and ghost images in the multiplexed image. Therefore, a further step is necessary to avoid such artifacts. This will be described below in a first illustrative example.

Figure 4:
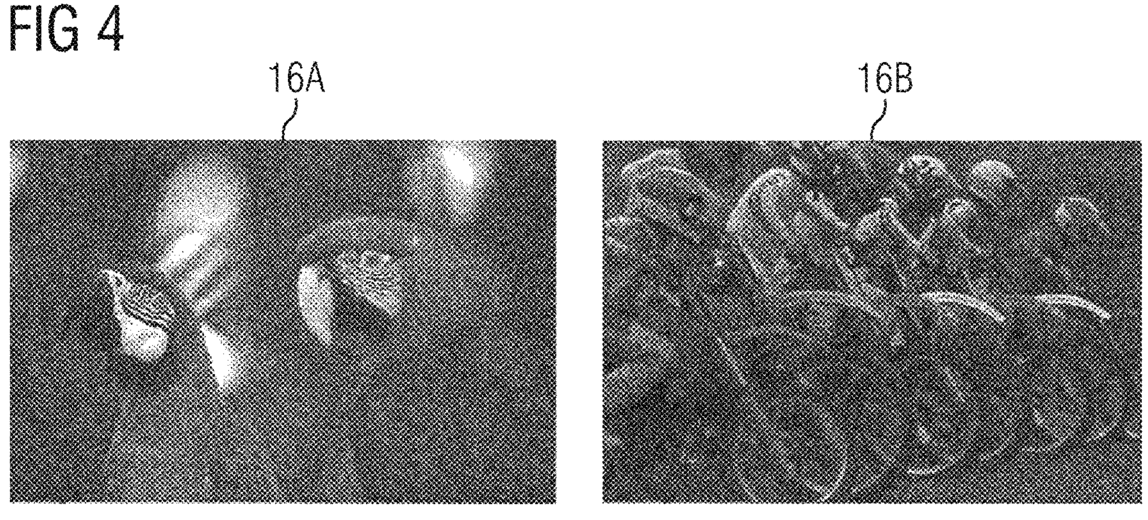
FIG. 4 shows two exemplary input images to be used in the methods of the present disclosure.

FIG. 4 shows two input images 16A and 16B, which are to be used for forming a multiplexed image. Here, each pixel in each input image has a color value, which can be described using an appropriate number of dimensions. For example, in case of a monochrome image, only lightness is necessary to represent the color value of each pixel, resulting in a one-dimensional color value. On the other hand, in a three-dimensional space such as RGB, a three-component vector is used to represent each color value.

Figure 5:
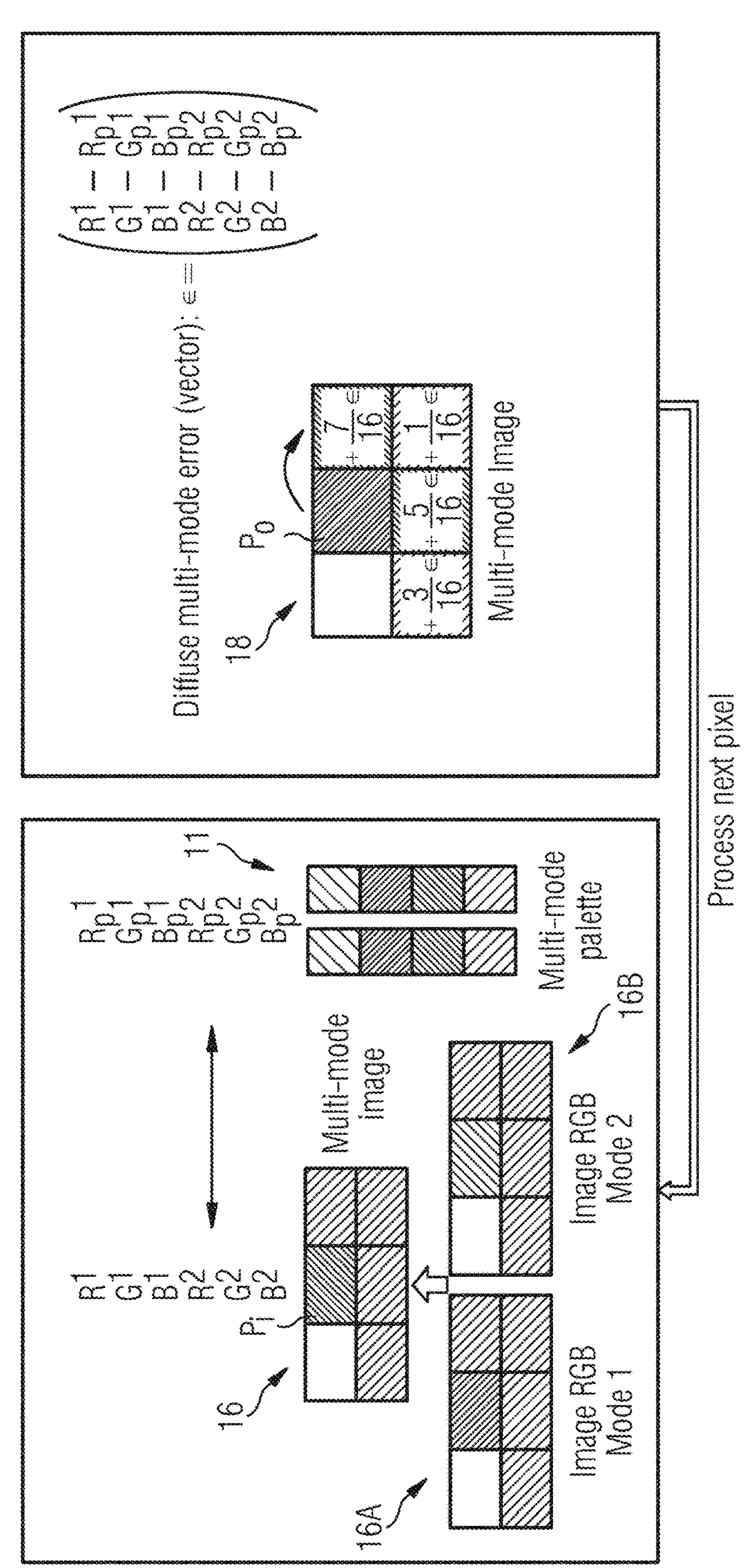
FIG. 5 illustrates a halftoning process in accordance with the present disclosure.

Without performing gamut mapping, input images 16A, 16B could be printed by a known process such as halftoning using multiplexed palette 10. Such a halftoning process is shown in FIG. 5. As shown in FIG. 5, for example, each input image 16A, 16B is an RGB image, with image 16A to be observed in mode 1, and image 16B to be observed in mode 2. Multiplexed input image 16 is formed by combining input images 16A and 16*b*. Accordingly, each pixel in multiplexed input image 16 has a six-dimensional color value, as shown in FIG. 5. A halftoning process, for example, multi-mode vector error diffusion can be used to map each six-dimensional color value in multiplexed input image 16 to a color value in multiplexed palette 10. Here, in order to increase the efficiency of the printing process, a reduced palette 11 may be generated based on multiplexed palette 10, which reduced palette 11 only includes a desired number of (in the example, six-dimensional) color values obtainable by printing apparatus 100. This will be described in more detail below. In other embodiments, however, the full palette 10 may be used instead.

As halftoning techniques such as vector error diffusion are well-known, only a very brief explanation will be given herein. As shown in FIG. 5, a color value of a pixel $p_i$ of multiplexed input image 16 is compared to the color values of each entry in palette 11 to determine the best match. Here, the skilled person immediately recognizes how the best match can be determined, namely, by determining the entry in palette 11 that has the least distance from the color value of the pixel in the selected color space using an appropriate metric. The color value of the best match in palette 10 is used as the color value of the corresponding pixel $p_o$ in a multiplexed output image 18.

Generally, there will be a deviation between the color value of palette 11 and the color value of the multiplexed input image for each pixel. To diffuse this error, an error vector ε is defined as the difference between the color value of the pixel of the input image and the color value of the entry in palette 11. As shown in FIG. 5, in case of two RGB images to be multiplexed, this error vector ε is a six-dimensional vector. The error vector ε is added to the color values of subsequent pixels in multiplexed input image 16. For example, $\frac{7}{16}\varepsilon$ is added to the color value of the next pixel. The resulting color value forms the basis for determining the best match between the color value of the next pixel in input image 16 and the color values in palette 11. This process is repeated to obtain multiplexed output image 18.

It will be appreciated that, depending on the colors in palette 11, the range of obtainable color values using a process such as halftoning is limited. In other words, multiplexed input image 16 may include pixels having color values that are outside the obtainable range. While the halftoning such as vector error diffusion could still be implemented using the formalism shown in FIG. 5, it would result in distortions and artifacts in output image 18. Therefore, it is advantageous to perform gamut mapping to map the color values in multiplexed input image 16, for example, to the finite shape (e.g., the convex hull or alpha shape) defined by multiplexed palette 11. The process of gamut mapping is known, for example, from US 2007/0097389 A1, such that the details will be omitted herein. Generally, gamut mapping can be understood as mapping the color values of multiplexed input image 16 to corresponding color values that are inside the gamut description (e.g., the convex hull or other mathematical shapes) defined by the colors in multiplexed palette 11 (including, for example, colors which can be obtained by a selected halftoning process). The result of this process is that color values that are outside of the range obtainable with palette 11 are mapped to color values that are obtainable with said palette. As previously mentioned, however, the step of gamut mapping cannot be generalized to the case of multiplexing in a straightforward manner. This is explained in more detail below with respect to FIG. 6.

Figure 6:
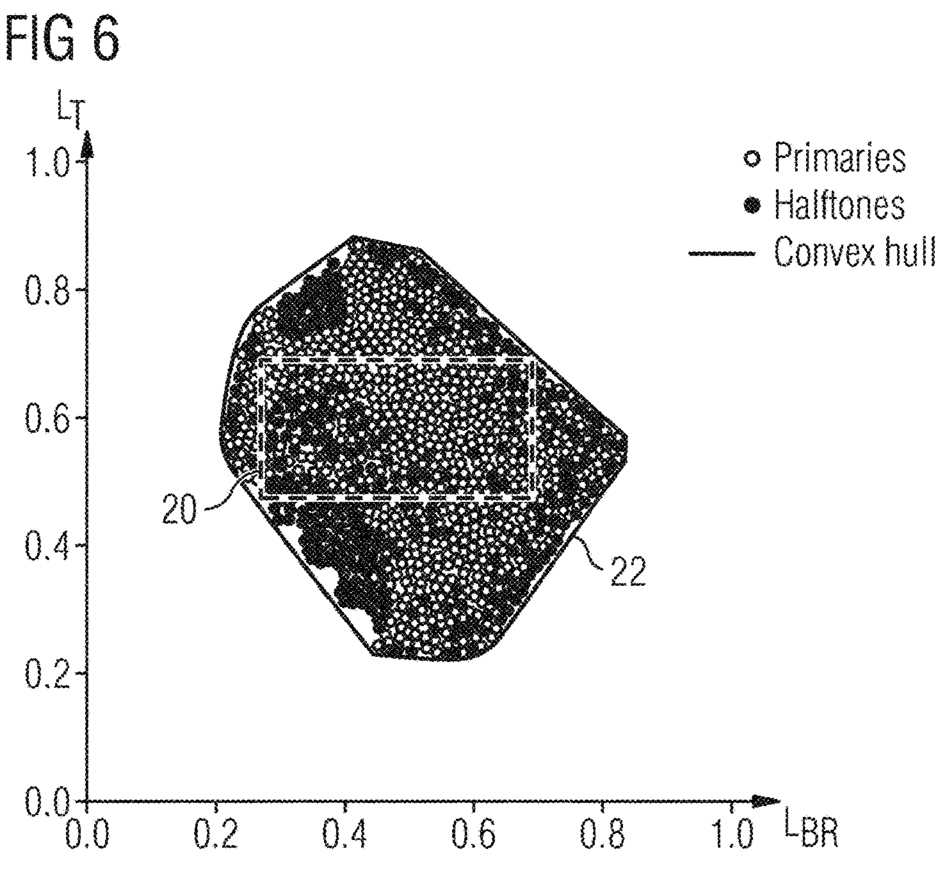
FIG. 6 shows an example of a color space for a multiplexing process in accordance with the present disclosure.

As shown in FIG. 6, in an illustrative example in which two monochrome images are to be multiplexed, only a single color value (lightness) is present in each mode. In other words, for each image, a first lightness $L_T$ in a first mode such as transmission can be measured, and a second lightness $L_{BR}$ can be measured in a second mode such as backside reflection. The resulting color space is a two-dimensional space, as shown in FIG. 6. Here, the measurement results of all the colors (primaries) obtainable by a given printing apparatus 100 are shown as white circles. In addition, the colors obtainable by halftoning of the primaries are shown as hatched circles. Together, the primaries and the halftones define the finite shape 22 (in the example, the convex hull) containing all obtainable colors. Here, it is immediately evident that, for a given color value in the first mode (for example, $L_T$=0.6), only a subset of color values in the second mode ($L_{BR}$) can be obtained. In order to be able to successfully multiplex the two images without forming ghost images, a lightness range has to be found for which all lightness pairs are obtainable (for example, by performing appropriate gamut mapping).

It has been recognized that the above requirement is met by any rectangle that is inside the finite shape 22. Further, it has also been recognized that the area of the rectangle is the geometrical mean of the maximum contrast attainable in each mode. Therefore, it follows that maximizing the area of this rectangle allows maximizing the contrast of the produced images. There are several algorithms for finding the maximum area enclosed rectangle inside a given shape (see, for example, the description at http://cgm.cs.mcgill.ca/~athens/cs507/Projects/2003/DanielSud/).

Therefore, in case of multiplexing, the printing process includes the step of determining a maximum volume hyperrectangle 20 enclosed in finite shape 22 of palette 10 in the combined color space defined by palette 10. It will be appreciated that the expression “hyperrectangle” can refer to any n-dimensional cuboid shape in a corresponding color space. Further, it will be appreciated that this determination is independent of a particular multiplexed input image, i.e., it could be done in advance, and the result could be stored in memory 104 for later use during a printing process.

After the maximum enclosed hyperrectangle has been found, gamut mapping of the color values of input image 16 to color values inside maximum volume hyperrectangle 20 is performed. In this manner, it can be assured that all pairs of color values of the two multiplexed images can be obtained using the available palette. Based on this, output image 18 can be printed by halftoning using palette 10 and the gamut-mapped color values of input image 16. This can be done, for example, by using the exemplary halftoning process described above with respect to FIG. 5.

In case of higher dimensions, for example, a first image being a monochrome image and a second image having a two-dimensional color value, the resulting combined color space will be a three-dimensional space. In that case, however, a range of possible color values in the subspace defined by the two-dimensional color values may not necessarily be a rectangle. The rectangle is only an approximation, and the optimization of more complex shapes is a difficult problem. In addition, multiplexed gamut mapping for such complex shapes is also not straightforward. This will be explained in more detail below.

Figure 7:
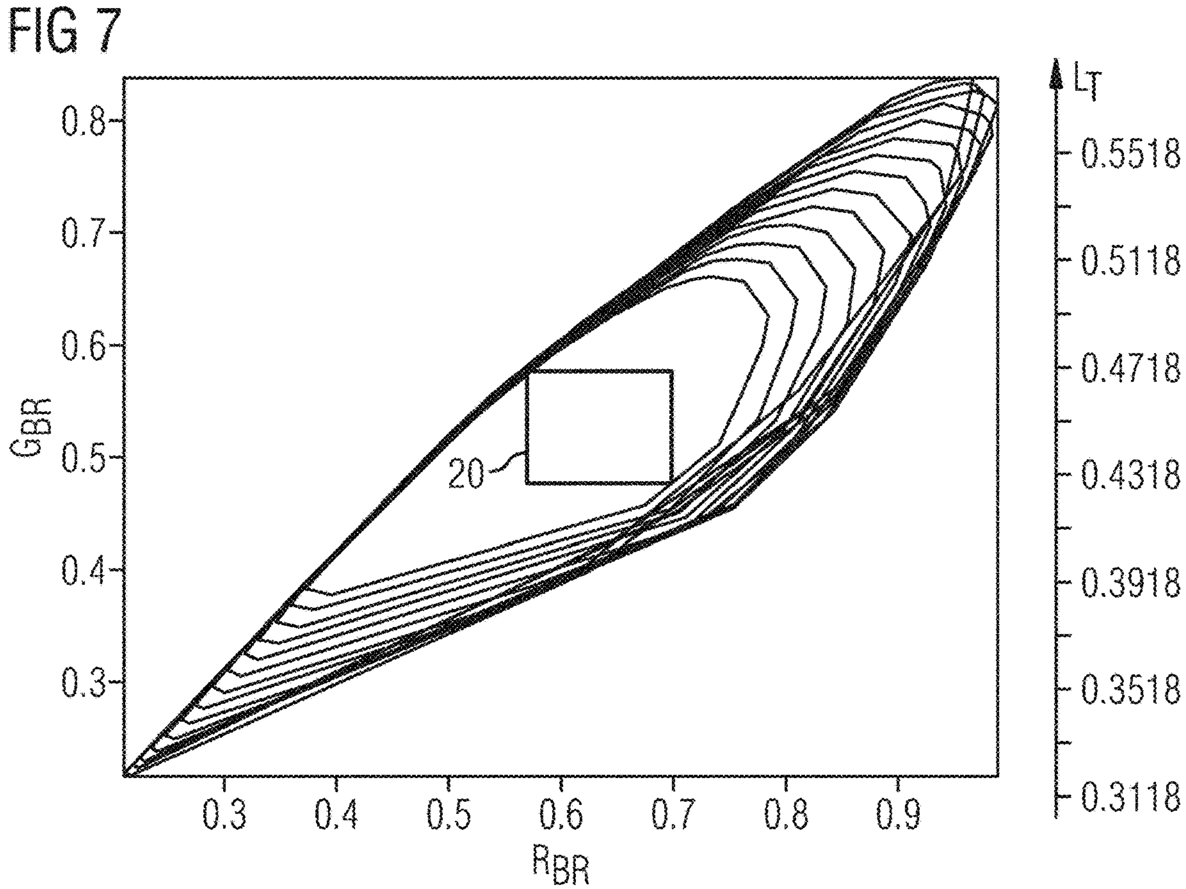
FIG. 7 illustrates another example of a color space to be used in a multiplexing process in accordance with the present disclosure.

FIG. 7 illustrates projections of the convex hull onto the two-dimensional plane defined by color values $G_{BR}$ and $R_{BR}$ of multiplexed image 14 when viewed under backside reflection, for different lightness values $L_T$ of the image when viewed in transmission. It is evident from FIG. 7 that the projected hyperrectangle 20 is considerably smaller than the ellipsoid-shaped area inside the innermost projection of the convex hull representing the maximum area for which the two modes are independent. As explained above, this results in a reduced contrast (a reduced volume inside the convex hull).

Figure 8:
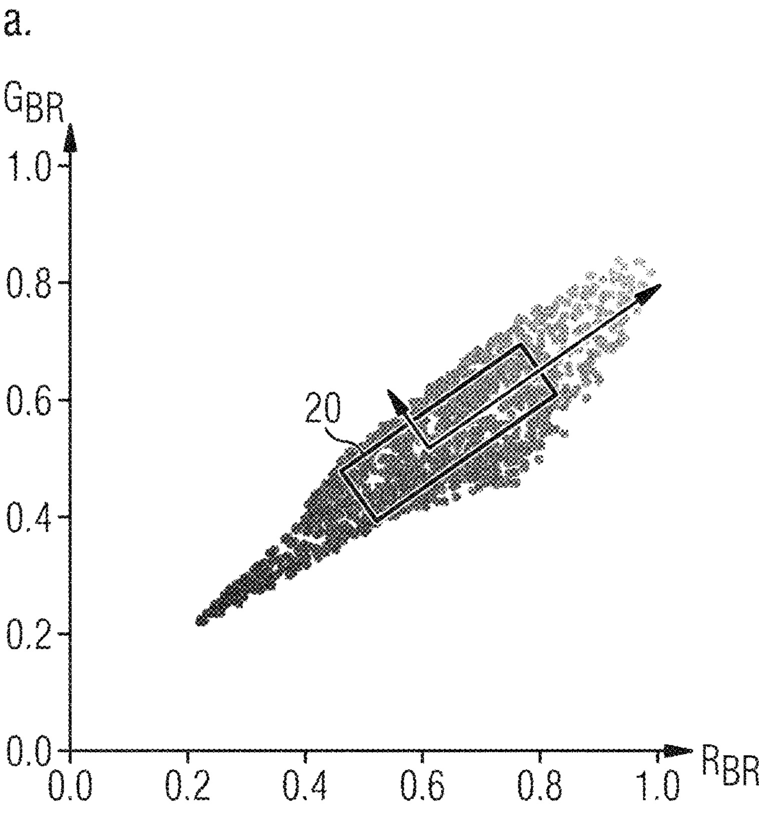
FIG. 8 illustrates a change of basis performed in a multiplexing process in accordance with the present disclosure.
Figure 8:
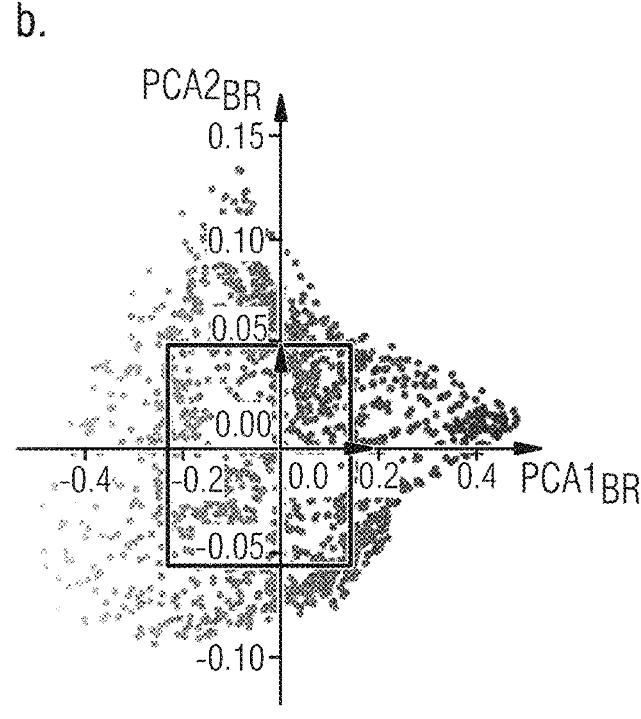
Figure 9:
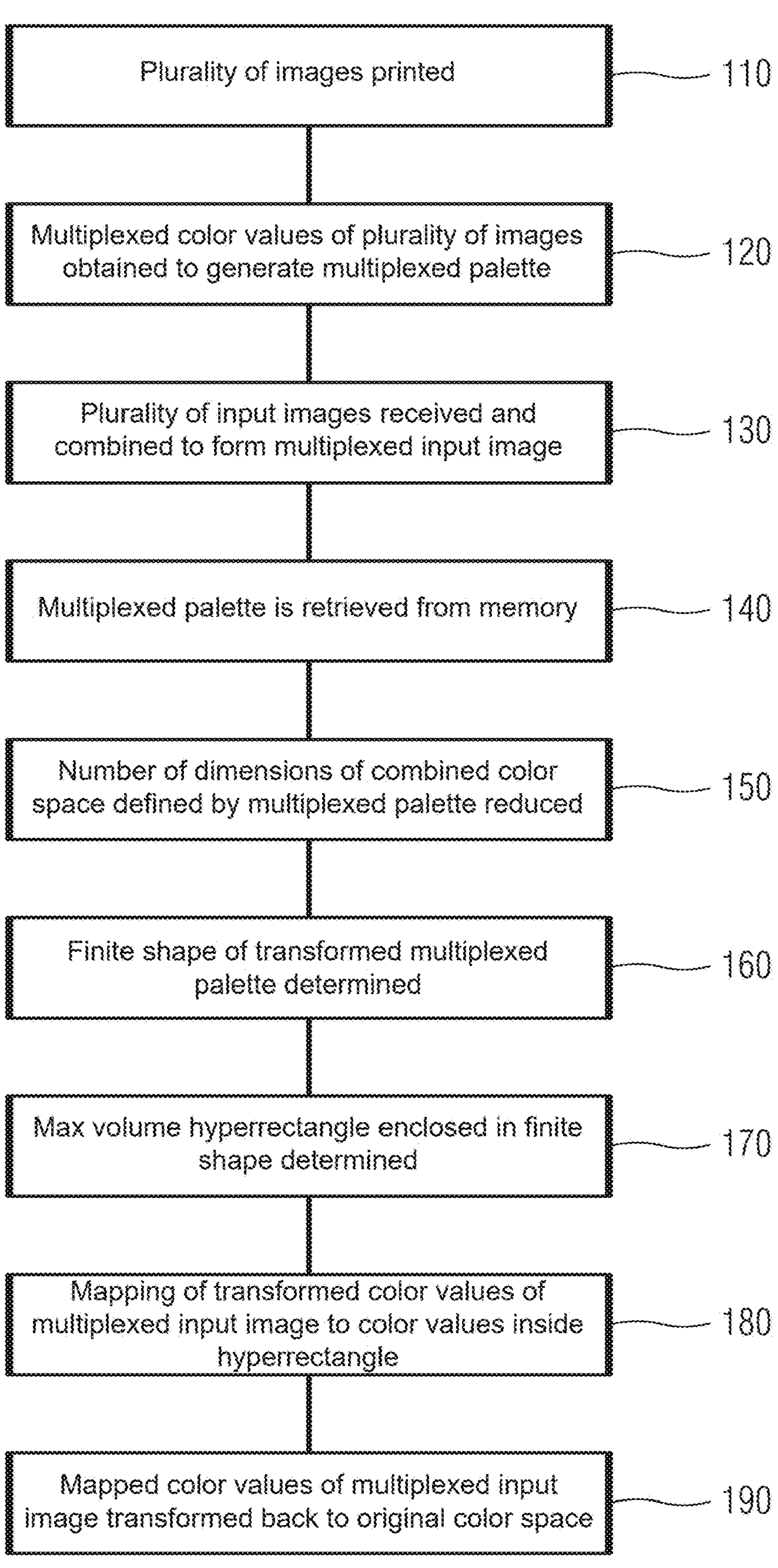
FIG. 9 shows an exemplary flow diagram of a method in accordance with the present disclosure.

It has been found that the above can be solved by performing a change of basis, optionally in combination with a dimensionality reduction. This will be described below for the present example with reference to FIG. 8. In the example, for each multiplexed image 12 in palette 10, the first image is a monochrome image described by a color value indicating lightness such as $L_T$, and the second image is a color image described by color values $G_{BR}$ and $R_{BR}$ (with fixed color value $B_{BR}$). The resulting multiplexed color value is three-dimensional.

FIG. 8*a* shows the projection of the multiplexed color values of palette 10 onto a plane having a given lightness $L_T$. In addition, FIG. 8*a* also shows the projection of the maximum volume hyperrectangle 20 for the given lightness value $L_T$. As can be seen in FIG. 8*a*, the projection is no longer aligned with the axes of the color space. While there are algorithms to find rectangles that are not axis-aligned, said algorithms scale poorly with the number of dimensions. Therefore, it is preferable to perform a change of basis in each separate color space to maximize the volume of the convex hull or other shape that can be covered by an axis-aligned rectangle. This can be coupled with a projection in order to reduce the dimensionality of the data. There are several algorithms for performing such a change of basis and dimensionality reduction. PCA is the most common algorithm. PCA finds orthogonal axes to represent the data based on the eigenvectors of its covariance matrix. For example, when applying PCA to the R and G colors of the palette, the axes found can be described as $PCA1_{BR}=-0.82R_{BR}-0.58G_{BR}$ and $PCA2_{BR}=0.57R_{BR}-0.82G_{BR}$. The resulting axes are shown in FIG. 8*b*. From FIGS. 8*a* and 8*b*, it is evident that performing the change of basis allows finding a larger (three-dimensional) hyperrectangle in the ($L_T$, $PCA1_{BR}$, $PCA2_{BR}$) space. Therefore, it is preferable to perform the basis transformation before performing the gamut mapping. Of course, this also requires transforming the image to be multiplexed to the PCA basis before performing the gamut mapping.

To perform the dimensionality reduction, PCA or a similar technique must be applied directly to the original palette images. This is done independently for each mode. When applied to the full color space, up to three eigenvectors will be found, and dimensionality reduction is obtained by ranking the eigenvectors by their variance, and choosing the first or the two first ones. Proceeding in such a manner also allows reducing the dimensions of, for example, the six-dimensional color space resulting from multiplexing of two full color images to a three-dimensional color space defined by, for example, the palette in the first mode projected onto a single axis PCA0, and the palette in the second mode projected onto the first two axes PCA1' and PCA2'.

It will be appreciated that the above formalism for multiplexed images can be generalized to higher dimensions, and is not limited to the case where the combined color space is a two- or three-dimensional space. Therefore, in the method for generating the palette, a further step of reducing a number of dimensions of the combined color space by appropriate processing of the color values in each of the plurality of modes may be present. It will be appreciated that the reduction of the number of dimensions can also be used independently from the change of basis explained above. In other words, the number of dimensions can also be reduced to obtain a lower-dimensional combined color space, and the maximum volume hyperrectangle can be determined in the color space having the reduced dimensions in a straightforward manner.

In other cases, however, the method further comprises performing a change of basis in each of the plurality of modes, and transforming the color values in each of the plurality of modes to the changed basis. In some embodiments, the above can be achieved by performing a principal component analysis in each of the plurality of modes, optionally in combination with reducing the number of dimensions, to obtain the combined color space.

As a result, the multiplexed palette is obtained either in the color space after the change of basis, or the original color space. In order to obtain the multiplexed palette, however, it is necessary to transform the colors determined in the color space after the change of basis back to the original color space.

In case a change of basis is performed, the method further comprises transforming color values of input image 16 in each mode to respective bases forming the combined color space prior to performing the gamut mapping to obtain gamut-mapped color values. In other words, the color values of the input image have to be transformed to the combined color space after the transformation, the finite shape in the transformed space is defined by the transformed color values of the multiplexed palette, and the maximum volume hyper-rectangle 20 is determined in the combined color space after transformation. Then, gamut mapping is performed in the combined color space after transformation to map color values of the input image to color values inside the hyper-rectangle 20. The gamut-mapped color values of the input image are then transformed back to the original color values, and halftoning is performed using the palette 10 and the transformed gamut-mapped color values in the original color space.

As previously mentioned, in some cases, it may be desirable to reduce the number of color values in palette 10. This will be described in more detail below.

In a first step, a full color gamut value (also referred to as color gamut) of the first plurality of images 12 is determined based on the obtained color values. Here, the expression "color gamut value" is to be interpreted broadly as the area or volume (or higher-dimensional volume) including the color values of the first plurality of images 12 in the selected color space. For example, in a two-dimensional space, the color gamut value can be the area of the finite shape in a chromaticity diagram, and in a three-dimensional color space it can be the volume of the finite shape in, for example, the CIELAB color space. The calculation of the respective color gamut values is well-known, such that the details will be omitted herein. Regardless of the dimensions, however, the result will be a number $gv_{full}$ representing the color gamut of all the different images.

In a subsequent step, for each image of the first plurality of images 12, a reduced color gamut value of the first plurality of images 12 not including said image is determined in the same manner. In other words, for example, the color gamut value $gvr_1$ when the color value $cv_1$ of a first image 12 is not included is calculated. Then, for each image of the first plurality of images 12, a ratio between the reduced color gamut value and the full color gamut value is calculated in step 150. As a result, a number of ratios $gvr_1/gv_{full}$ . . . $gvr_{n \times m}/gv_{full}$ is obtained. This ratio can be interpreted as specifying the ratio between the gamut volume that remains when a specific color is removed and the full gamut volume. Accordingly, the lower this ratio, the more the corresponding image contributes to the full gamut volume.

Therefore, in order to select a predetermined number N of colors (images), the N images that contribute the most to the gamut volume are selected by determining the images 12 associated with the predetermined number N of smallest ratios of the previously calculated ratios.

Next, the images 12 associated with the predetermined number N of smallest ratios are determined. As will be described in more detail below, in case of multiplexed images, this process may involve several additional steps.

After determining the images associated with the predetermined number N of smallest ratios, in a next step, the color values of the images associated with the predetermined number N of smallest ratios are stored in association with the one or more parameters used to print the same to form reduced palette 11. For example, the color values and the one or more parameters may be stored in memory 104 of printing apparatus 100.

It will be appreciated that the above is merely one example for determining a set of images (color values) including the predetermined number of images and having a maximum color gamut value of all possible different sets of images including the predetermined number of images, and storing the at least one color value of each image in the set of images having the maximum color gamut value in association with the one or more parameters used to print the image to form the palette. In another example, all possible sets (i.e., combinations) of images including the predetermined number of images can be determined, and for each set or combination, the color gamut value can be determined. Then, the set having the largest color gamut value out of all possible sets is determined as the set of images to be used for forming the palette.

In the above process, optional steps of selecting a halftoning technique to be used in the printing process, and determining the full color gamut value and the reduced color gamut values based on the selected halftoning technique may be included. The reason for this is that, in general, the halftoning technique that is to be used in the printing process has an effect on the colors that are obtainable with the primary colors in the palette shown in FIG. 2. In this respect, it is important to note that the respective color gamut values are not solely calculated based on the primary colors, but based on all colors obtainable using said primary colors, for example, by performing halftoning. However, in some embodiments, it is also contemplated to calculate the color gamut values based on only the primary colors directly obtainable by printing apparatus 100.

As mentioned above, it may be advantageous to perform gamut mapping of the input image to be printed. Here, the gamut mapping involves using a gamut description to perform the same. Said gamut description may also affect the calculation of the full color gamut value and the reduced color gamut values. Therefore, optional steps of selecting a gamut description to be used in a gamut mapping process, and determining the full color gamut value and the reduced color gamut values based on the selected gamut description may be included.

In some embodiments, the predetermined number N of smallest ratios, i.e., the predetermined number N of colors to be used for palette 10, may be between 3 and 50, preferably between 6 and 16, but in other embodiments it can also be more than 50. In this manner, a processing time for printing the images can be reduced significantly when compared to the case where a palette including all obtainable colors (e.g., several hundred or more than a thousand colors) is used to print the images.

In principle, the above-described method of determining a predetermined number N of color values in a reduced palette can be applied to the multiplexing of images in a straightforward manner. For example, in case of two RGB images to be multiplexed, for each image 12, a six-dimensional color value (the values R, G and B in the first mode and the values R, G and B in the second mode) can be measured using measuring device 102 in the two modes. All measured color values are then used to populate the corresponding combined color space, which in this case is six-dimensional. Further, using an appropriate metric, the above-described color gamut values can be calculated (for example, by performing an appropriate multi-dimensional integration in a known manner). The resulting color gamut values can then again be used to calculate the corresponding ratios, and select the predetermined number N of smallest ratios. Each of said smallest ratios is associated with a particular one of the images 12 printed by printing apparatus 100. In this manner, a reduced multiplexed palette 11 can be obtained and stored, the multiplexed palette including a first color value in a first mode and a second color value in a second mode in association with the corresponding parameters of printing apparatus 100. The resulting palette 11 may then be used to print a desired image.

In case a change of basis is performed, however, the full color gamut value and the reduced color gamut value are calculated in the combined color space after transformation. As a result, the reduced palette is first obtained in the color space after the change of basis, and in order to obtain the reduced multiplexed palette 11 in the original color space, it is necessary to transform the color values determined in the color space after transformation back to the original color space.

INDUSTRIAL APPLICABILITY

With the above-described teachings, two or more input images can be printed as a multiplexed image. Preferably, the input image includes at least one color image, and the printing is performed using a laser marking apparatus. In this manner, for example, security features forming part of an identification document or the like can be laser printed while optimizing a contrast of the two or more images in the respective modes.

An exemplary method of generating a multiplexed image 18 for printing that can be observed in a plurality of modes and can be printed using a printing apparatus 100 will be described in the following.

In a first step 110, the plurality of images 12 is printed using printing apparatus 100. This results in n×m images 12 which can be observed in a plurality of modes (for example, a first mode and a second mode) and have a plurality of (for example, two) color values corresponding to the plurality of modes.

In a second step 120, the multiplexed color values of the plurality of images 12 are obtained by measurement to generate multiplexed palette 10, i.e., first palette 10A and second palette 10B shown in FIG. 2. It will be appreciated that steps 110 and 120 are usually performed in advance, for example, during a calibration process or the like, to obtain a database of color values obtainable by printing apparatus 100. Such a database may be stored in memory 104 of printing apparatus 100, and retrieved as needed when a multiplexed image 18 for printing is to be generated.

In step 130, a plurality of input images 16A, 16B (see FIG. 4) is received, and the plurality of input images 16A, 16B are combined to form a multiplexed input image 16. In case of input images 16A, 16B being two RGB images, as shown in FIG. 5, each pixel in multiplexed image 16 has a six-dimensional color value. Here, it will be appreciated that, generally, each image 12 also will be characterized by a six-dimensional color value, unless special filters or algorithms are applied during measuring of the color values, or the material forming substrate surface 14 has particular properties resulting in that processing by printing apparatus 100 results in images 12 having color values that can be expressed as two-dimensional or one-dimensional color values. In the following, however, it will be assumed that each pixel in multiplexed input image 16, as well as each of the plurality of images 12 is described by a six-dimensional color value.

In step 140, multiplexed palette 10 is retrieved from memory 104, and in step 150, a number of dimensions of the combined color space defined by multiplexed palette 10 is reduced by appropriate processing of the multiplexed color values of the same. In some embodiments, a principal component analysis is performed in each of the plurality of modes (in the present example, two modes). Accordingly, three eigenvectors will be obtained for each mode. Said eigenvectors are ranked, and a desired number of eigenvectors are kept. For example, only the first eigenvector could be kept in the first mode, and the first two eigenvectors could be kept in the second mode. As a result, three eigenvectors are kept in total, and a new three-dimensional basis (for example, $PCA0_T$, $PCA1_{BR}$ and $PCA2_{BR}$) is obtained in case multiplexed image 16 is viewed in transmission in the first mode and under backside reflection in the second mode.

In step 160, multiplexed palette 10 is transformed to the color space defined by the new basis, and the finite shape 22 of the transformed multiplexed palette 10 is determined. Subsequently, a maximum volume hyperrectangle 20 enclosed in the finite shape 22 of multiplexed palette 10 in the transformed color space is determined in step 170.

In step 180, multiplexed input image 16 is transformed to the color space defined by the new basis, and gamut mapping of the transformed color values of multiplexed input image 16 to color values inside the maximum volume hyperrectangle 20 in the transformed space is performed. As a result, gamut-mapped color values of the multiplexed input image in the transformed color space are obtained.

In a final step 190, the gamut-mapped color values of the multiplexed input image 16 are transformed back from the transformed space into the original color space. In this manner, the multiplexed image 18 for printing is obtained. This multiplexed image for printing can be printed by printing apparatus 100 using a selected halftoning technique such as vector error diffusion and original multiplexed palette 10.

As previously mentioned, in some cases, it may be desirable to include an additional step of reducing the colors to be used for printing to obtain reduced palette 11.

In some embodiments, the exemplary method described above further comprises the step of printing the generated multiplexed image 18 using multiplexed palette 10 or reduced palette 11 and the gamut-mapped color values of multiplexed input image 16.

It will be appreciated that the above exemplary method is only an example, and that the steps of reducing the number of dimensions of the combined color space, for example, by performing PCA, can be omitted. In particular, this may be possible in case the dimensionality of the original combined color space is small, for example, three or four. In a similar manner, the step of reducing the colors in the multiplexed palette 10 may also be omitted. The reason for this is that, especially in higher dimensions, the determination of the maximum volume hyperrectangle already results in a considerable reduction of the volume of the finite shape, thereby automatically limiting the number of primaries that will be used during the selected printing process.

It will also be appreciated that, although two input images being observed in two modes have been described above, the present disclosure is not limited to the case of two input images, and any desired number of input images can be used for multiplexing, as long as the material of substrate surface 14 allows for observation of different images in such different modes. Also in case of a large number of modes, the dimensionality reduction can be performed for each mode, or for one or more selected modes.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

ASPECTS

1. A method of generating a multiplexed image (18) for printing that can be observed in a plurality of modes and can be printed using a printing apparatus (100), comprising:

receiving a plurality of input images (16A, 16B);

combining the plurality of input images (16A, 16B) to form a multiplexed input image (16);

retrieving a multiplexed palette (10) from a memory (104), the multiplexed palette including a plurality of images (12) that can be printed on a substrate surface (14) by varying one or more parameters of the printing apparatus (100), each image (12) being observable in the plurality of modes and having a plurality of color values corresponding to the plurality of modes;

determining a finite shape (22) of the multiplexed palette (10) in a combined color space based on the color values of the plurality of images (12);

determining a maximum volume hyperrectangle (20) enclosed in the finite shape (22) of the multiplexed palette (10);

performing gamut mapping to map color values of the multiplexed input image (16) to color values inside the maximum volume hyperrectangle (20); and obtaining the multiplexed image (18) for printing based on the gamut-mapped color values of the multiplexed input image (16).

2. The method of aspect 1, further comprising reducing a number of dimensions of the combined color space by appropriate processing of the multiplexed color values.

3. The method of aspect 1 or 2, further comprising:

performing a change of basis for at least one of the plurality of modes to obtain at least one changed basis, the combined color space being defined at least in part by the at least one changed basis;

transforming the color values in the at least one of the plurality of modes to the changed basis; and performing the steps of determining the finite shape, determining the maximum volume hyperrectangle, and performing the gamut mapping in the combined color space being defined at least in part by the at least one changed basis.

4. The method of aspect 3, further comprising:

performing a principal component analysis in the at least one of the plurality of modes, optionally in combination with reducing a number of dimensions, to obtain the combined color space.

5. The method of aspect 3 or 4, further comprising:

transforming the gamut-mapped color values of the input image (16) in the at least one of the plurality of modes back to the original basis.

6. The method of any one of aspects 1 to 5, further comprising printing the generated multiplexed image (18) using the multiplexed palette (10) and the gamut-mapped color values of the multiplexed input image (16), preferably by halftoning.

7. The method of any one of aspects 1 to 6, further comprising:

selecting a predetermined number (N) of images (12) to be used for generating a reduced palette (11);

determining a set of images (12) including the predetermined number (N) of images (12) and having a maximum color gamut value of all sets of images including the predetermined number (N) of images (12); and using the determined set of images to form the reduced palette (11), wherein the step of determining the finite shape (22) is performed on the basis of the reduced palette (11).

8. The method of aspect 7, wherein the step of determining the set of images (12) having the maximum color gamut value includes:

determining a full color gamut value of the plurality of images (12) of the multiplexed palette (12);

for each image of the plurality of images (12), determining a reduced color gamut value of the plurality of images (12) not including said image and calculating a ratio between the reduced color gamut value and the full color gamut value;

determining the predetermined number (N) of smallest ratios; and determining (170) the images (12) associated with the predetermined number (N) of smallest ratios as the set of images (12) having the maximum color gamut value.

9. The method of aspect 7 or 8, further comprising:

selecting a halftoning technique to be used; and determining the color gamut values based on the selected halftoning technique.

10. The method of any one of aspects 7 to 9, further comprising:

selecting a gamut description to be used for the gamut mapping; and determining the color gamut values based on the selected gamut description.

11. The method of any one of aspects 7 to 10, wherein the color gamut values are calculated as an area of the finite shape in a chromaticity diagram or another two-dimensional color space, or a volume of the finite shape in a three dimensional color space such as RGB or CIELAB.

12. The method of any one of aspects 7 to 11, wherein the predetermined number (N) is between 3 and 50, preferably between 6 and 16.

13. The method of any one of aspects 1 to 12, further comprising:
printing the plurality of images (12) using the printing apparatus (100); and
obtaining the multiplexed color values of the plurality of images (12) by measurement.
14. The method of any one of aspects 1 to 13, wherein the printing apparatus (100) is a laser marking apparatus, and the parameters include one or more of: laser power; scanning speed; laser focus; laser spacing; repetition rate; laser polarization; laser wavelength; pulse duration.
15. A printing apparatus (100), preferably a laser marking apparatus, comprising;
a memory (104); and
a control unit (106) configured to perform the method of any one of the preceding aspects.

The invention claimed is:

1. A method of generating a multiplexed image for printing that can be observed in a plurality of modes and can be printed using a laser marking apparatus, the method comprising:
receiving a plurality of input images;
combining the plurality of input images to form a multiplexed input image;
retrieving a multiplexed palette from a memory, the multiplexed palette including a plurality of images that can be printed on a substrate surface by varying one or more parameters of the laser marking apparatus, each image being observable in the plurality of modes and having a plurality of color values corresponding to the plurality of modes;
determining a finite shape of the multiplexed palette in a combined color space based on the color values of the plurality of images;
determining a maximum volume hyperrectangle enclosed in the finite shape of the multiplexed palette;
performing gamut mapping to map color values of the multiplexed input image to color values inside the maximum volume hyperrectangle; and
obtaining the multiplexed image for printing based on the gamut-mapped color values of the multiplexed input image.

2. The method of claim 1, further comprising reducing a number of dimensions of the combined color space by appropriate processing of multiplexed color values of the multiplexed palette.

3. The method of claim 1, further comprising:
performing a change of basis for at least one of the plurality of modes to obtain at least one changed basis, the combined color space being defined at least in part by the at least one changed basis;
transforming the color values corresponding to the at least one of the plurality of modes to the at least one changed basis; and
performing the steps of determining the finite shape, determining the maximum volume hyperrectangle, and performing the gamut mapping in the combined color space being defined at least in part by the at least one changed basis.

4. The method of claim 3, further comprising performing a principal component analysis in the at least one of the plurality of modes to obtain the combined color space.

5. The method of claim 4, further comprising performing the principal component analysis in combination with reducing a number of dimensions of the combined color space by appropriate processing of multiplexed color values of the multiplexed palette.

6. The method of claim 3, further comprising transforming the gamut-mapped color values of the multiplexed input image in the at least one of the plurality of modes back to an original basis.

7. The method of claim 1, further comprising printing the multiplexed image using the multiplexed palette and the gamut-mapped color values of the multiplexed input image.

8. The method of claim 7, wherein printing the multiplexed image comprises printing the multiplexed image by halftoning.

9. The method of claim 1, further comprising:
selecting a predetermined number (N) of images to be used for generating a reduced palette;
determining a set of the plurality of images including the predetermined number (N) of images and having a maximum color gamut value of all sets of the plurality of images including the predetermined number (N) of images; and
using the determined set of the plurality of images to form the reduced palette;
wherein the step of determining the finite shape is performed on the basis of the reduced palette.

10. The method of claim 9, wherein the step of determining the set of the plurality of images having the maximum color gamut value comprises:
determining a full color gamut value of the plurality of images of the multiplexed palette;
for each image of the plurality of images, determining a reduced color gamut value of the plurality of images not including said image and calculating a ratio between the reduced color gamut value and the full color gamut value;
determining the predetermined number (N) of smallest ratios; and
determining the images associated with the predetermined number (N) of smallest ratios as the set of the plurality of images having the maximum color gamut value.

11. The method of claim 10, further comprising:
selecting a halftoning technique to be used; and
determining the full color gamut value and the reduced color gamut values based on the selected halftoning technique.

12. The method of claim 10, further comprising:
selecting a gamut description to be used for the gamut mapping; and
determining the full color gamut value and the reduced color gamut values based on the selected gamut description.

13. The method of claim 9, wherein color gamut values are calculated as an area of the finite shape in a chromaticity diagram or another two-dimensional color space or as a volume of the finite shape in a three-dimensional color space.

14. The method of claim 9, wherein the predetermined number (N) is between 3 and 50.

15. The method of claim 14, wherein the predetermined number (N) is between 6 and 16.

16. The method of claim 1, further comprising:
printing the plurality of images using the laser marking apparatus; and
obtaining multiplexed color values of the plurality of images by measurement.

17. The method of claim 1, wherein the parameters of the laser marking apparatus comprise one or more of: laser power; scanning speed; laser focus; laser spacing; repetition rate; laser polarization; laser wavelength; or pulse duration.

18. A laser marking apparatus comprising:

the memory of claim 1; and a control unit configured to perform the method of claim 1.

* * * * *